Dec. 18, 1928.
W. N. BOOTH
WHEEL HUB
Filed Aug. 3, 1925
1,695,525
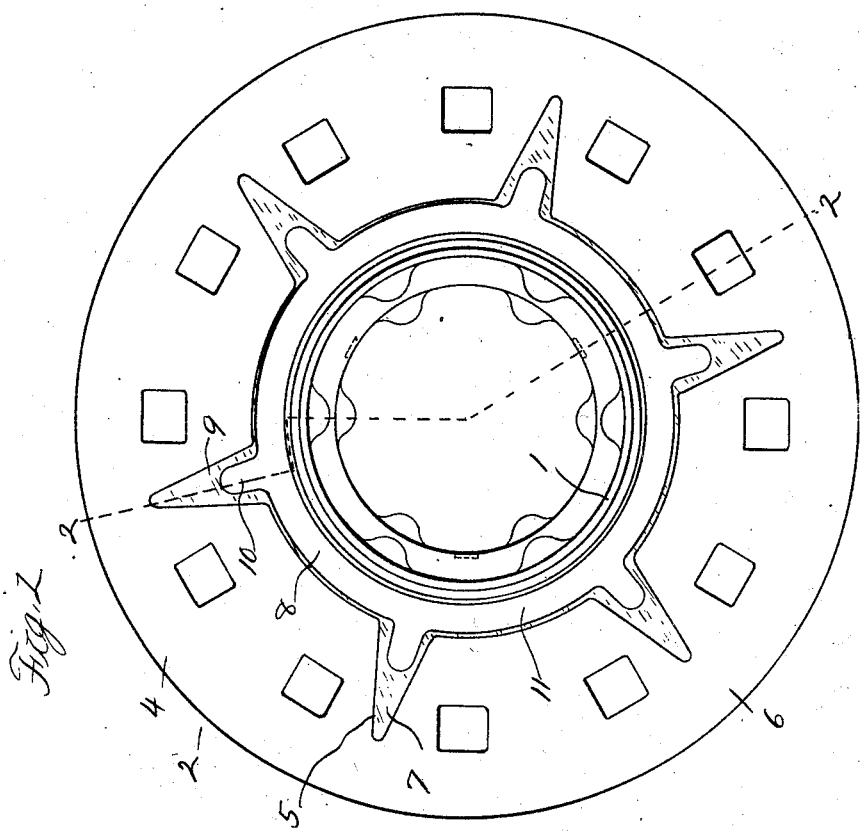
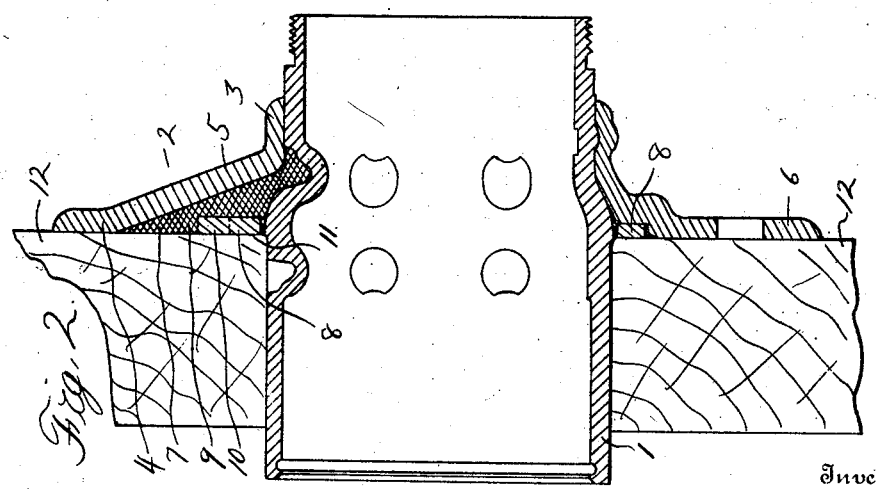
Inventor
William N. Booth
Attorneys Patented Dec. 18, 1928.

1,695,525

UNITED STATES PATENT OFFICE.

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK.

WHEEL HUB.

Application filed August 3, 1925. Serial No. 47,936.

The invention relates to wheel hubs and refers more particularly to the hubs of vehicle wheels which include a barrel and fixed flange. One of the objects of the invention is the provision of a hub having a barrel, a fixed flange upon the barrel with a bearing face extending transversely of the barrel and spaced therefrom and means providing a bearing face in substantial alignment with the fixed flange face and located between the fixed flange face and barrel whereby lateral support is provided at the inner ends of the wheel spokes as well as radially outward therefrom. Another object is the provision of means for reinforcing the fixed flange of the wheel hub. A further object is the provision of means for holding from rotation the insert which is located between the radial flange of the fixed flange and the barrel. With these as well as other objects in view the invention resides in the novel features of construction and combinations and arrangements of parts as more fully hereinafter set forth.

In the drawings:—

Figure 1 is an end elevation of a wheel hub embodying my invention;

Figure 2 is a cross section on the line 2—2 of Figure 1.

The vehicle wheel hub includes the pressed barrel 1 and the pressed fixed flange 2, which in the present instance are formed separately and then fixedly secured to each other. The fixed flange has the foot flange 3 which is substantially cylindrical and engages the barrel, the radial flange 4 and the reinforcing ribs 5 which extend radially and at an angle from the foot flange to the radial flange. The radial flange provides the bearing face 6 which extends transversely of and is spaced from the barrel. The ribs from revesses 7 on the same side of the fixed flange as the bearing face 6.

8 is a ring preferably formed of a metallic stamping, this ring engaging in the recess between the barrel 1 and the radial flange 4 and being secured in place by means of the brazing material 9, which is also located in this space and assists in fixedly securing the fixed flange to the barrel and further secures the ring in place. The ring has radial outward projections 10 which extend into the recesses 7 formed by the ribs 5 at their points of mergence into the radial flange 4, whereby the ring is held from rotation. Also, this ring provides the bearing face 11 extending transversely of the barrel and in substantial alignment with the bearing face 6 of the radial flange so that the wheel spokes 12 are laterally supported and guided at both their inner ends as well as radially outward therefrom. In addition to affording this inner bearing face for the spokes the ring reinforces the fixed flange.

What I claim as my invention is:

1. A wheel hub having, in combination, a barrel, a pressed flange secured upon said barrel and having a portion with a bearing face extending transversely of the axis of said barrel and a reinforcing portion extending from said bearing face to said barrel at an angle to said bearing face and forming a recess on the same side of said flange as said bearing face, and an insert for forming a bearing face located in said recess and secured to said barrel.

2. A wheel hub having, in combination, a barrel, a pressed flange secured upon said barrel and having an annular radial bearing face encircling said barrel and hollow reinforcing ribs extending from said bearing face to said barrel and forming recesses on the same side of said flange as said bearing face, and a ring for forming a bearing face in predetermined relation to said first-mentioned bearing face, said ring encircling said barrel and extending within the recesses formed by said ribs and secured to said barrel and flange.

3. A wheel hub having, in combination, a barrel, a pressed flange secured upon said barrel and having an annular bearing face encircling said barrel and extending transversely of the axis thereof, and hollow reinforcing ribs extending from said bearing face to said barrel at an angle to said bearing face and forming recesses on the same side of said flange as said bearing face, a ring encircling said barrel and having a bearing face in substantial alignment with said first-mentioned bearing face, said ring having radial projections engaging in the recesses formed by said ribs, and common means for securing said barrel, flange and ring to each other.

In testimony whereof I affix my signature.

WILLIAM N. BOOTH.